United States Patent [19]
Fujimura et al.

[11] Patent Number: 5,963,694
[45] Date of Patent: Oct. 5, 1999

[54] PHOTODIODE MODULE AND METHOD OF MAKING SAME

[75] Inventors: Yasushi Fujimura; Yoshiki Kuhara, both of Osaka, Japan

[73] Assignee: Sumitomo Electric Industries, Ltd., Osaka, Japan

[21] Appl. No.: 09/018,013

[22] Filed: Feb. 3, 1998

[30] Foreign Application Priority Data

Feb. 3, 1997 [JP] Japan ................................ 9-035566

[51] Int. Cl.⁶ .............................. G02B 6/42; G02B 6/32
[52] U.S. Cl. ............................ 385/88; 385/93; 385/90
[58] Field of Search ............................. 385/49, 88, 90, 385/93

[56] References Cited

U.S. PATENT DOCUMENTS

| | | | |
|---|---|---|---|
| 5,087,109 | 2/1992 | Ishizuka et al. | 385/34 |
| 5,412,229 | 5/1995 | Kuhara et al. | 257/183 |

FOREIGN PATENT DOCUMENTS

| | | | |
|---|---|---|---|
| 552 792 A1 | 7/1993 | European Pat. Off. | G02B 6/42 |
| 690323 A2 | 1/1996 | European Pat. Off. | G02B 6/42 |
| 64-79629 | 3/1989 | Japan | G01J 1/04 |
| 4-111477 | 4/1992 | Japan | H01L 31/10 |
| 5-224101 | 9/1993 | Japan | G02B 6/42 |
| 8-18077 | 1/1996 | Japan | H01L 31/0232 |

*Primary Examiner*—John D. Lee
*Assistant Examiner*—Juliana K. Kang
*Attorney, Agent, or Firm*—Pillsbury Madison & Sutro LLP

[57] ABSTRACT

This invention provides an analog PD module useful for a large number of channels and a digital PD module useful for a large power signal input because of its reduced distortion. The PD chip is fixed at a spot deviating by L tan α from the lens center in the direction of a projection of a vector TS from the highest edge (T) to the lowest edge (S), where L is the distance between the lens center and the PD. The fiber should deviate in the contrary direction. The orientation enables a beam emanating from the fiber end to pass the center of the lens and reach the PD by spreading on a direct line.

21 Claims, 8 Drawing Sheets

Pig-tail type

PD module

Defocus Alignment

Sensitivity and Distortion

Beam Distribution on a chip of Fig.5

W = 120 μm
X = −140 μm
Lf = 1850 μm
L = 2100 μm
a = 3.7° (θ = 8°)

Beam Distribution on a chip of Fig.6

W = −160 μm
X = +140 μm
Lf = 1650 μm
L = 2100 μm
a = 3.7° (θ = 8°)

$$n_1 \times \sin(\alpha + \theta) = n_2 \times \sin\theta$$

Pig-tail type

PHOTODIODE MODULE AND METHOD OF MAKING SAME

BACKGROUND OF THE INVENTION

1. Field of the Invention

This invention relates to a photodiode module and a method of making a photodiode module. The module has a photodiode and an optical fiber and is suitable for optical communication systems and optical measurements. The photodiode (PD) module is immune from distortion of signals and is capable of receiving various analog signals without distortion.

2. Description of Related Art

This application claims the priority of Japanese Patent Application No. 9-35566 (35566/97) filed Feb. 3, 1997 which is incorporated herein by reference.

As used herein, the term "photodiode module" refers to an assembly of a photodiode, an optical fiber, optical parts and a package. There are some proposals which deviate the PD chip axially forward or backward from the spot of the image of an end of the fiber by a lens in an assembly of a fiber, a lens and a PD chip. For example, Japanese Patent Laying Open No. 64-79629 (79629/'89) and Japanese Patent Laying Open No. 5-224101(224101/'93) suggest a photodiode module which displaces the relative position of the PD chip forward(inward) or backward (outward) from the image of the fiber using a lens for the sake of reducing the power of reflected light, decreasing the distortion of signals, etc.

The photodiode is a device having a package and a PD chip mounted in the package. The PD chip is a semiconductor chip having a pn-junction, an n-electrode and a p-electrode. One electrode through which light beams enter the PD chip is an annular electrode. FIG. 1 shows a section of a conventional, typical PD chip. The material of the light receiving layer is chosen in accordance with the wavelength of the light. Long wavelength bands, for example, 1.3 $\mu$m band or 1.55 $\mu$m band require a pin-photodiode having a light receiving layer of InGaAs mixture crystal. InGaAs photodiodes are produced on an epitaxial wafer having an n-InP substrate 81, an n-InP buffer layer 82, an InGaAs light receiving layer 83 and an n-InP window layer 84 grown on the InP substrate 81 in series in this order.

Selective diffusion of zinc (Zn) through a mask on the epitaxial wafer makes Zn-diffusing p-regions 85 and pn-junctions in the InGaAs light receiving layer 83. A p-electrode 86, an n-electrode 90, a passivation film 88 and an antireflection film 87 per a chip are formed on the wafer. The p-electrode 86 on the p-region 85 is a ring-shaped electrode having a wide opening through which incident light 89 enters the p-region 85. The n-electrode 90 uniformly covers the bottom of the n-InP substrate 81. The passivation film 88 protects the ends of the pn-junction, covering the outside of the ring p-electrode 86. The antireflection film 87 covers the p-region 85 for preventing the incident light from being reflected on the surface of the p-region region 85. The wafer is scribed into a plurality of individual photodiode (PD) chips.

An independent photodiode is made by building such a photodiode chip in a sealed metal-can package with a window. Otherwise, a PD chip is attached to an optical fiber or an optical connector for detecting optical signals propagating in the fiber. Such a device combining a PD chip via a lens with an optical fiber or an optical connector is called a "photodiode module (PD module)". In a PD module, an important matter is matching the fiber with the PD chip, since the PD must detect narrow beams emitted from a thin fiber. "Alignment" signifies an operation of matching a fiber to a PD chip in a PD module for maximizing the light power entering the PD chip via a lens and for providing maximum sensitivity to the PD module. Thus, alignment is one of the most important problems in building PD modules.

FIG. 2 shows a conventional photodiode module of a pig-tail type coupling an optical fiber to a PD chip. A PD chip 1 is fixed on a submount 13 soldered on a package 12. In coupling the PD chip 1 to the package 12, care should be taken for the alignment that the center of the PD chip 1 coincides with the center of the package 12. The center of a fiber 14 is positioned on an extension of the center axis line of the PD chip 1 and the package 12. All optical parts lie on a common axis in the prior PD module. This simple alignment is referred to as "common axis alignment". The package 12 has an anode pin 15, a cathode pin 16 and a case pin 17 extending downward from the bottom.

A cap 22 having a ball lens 23 is fixed on the package 12. The inner space of the package is hermetically sealed by the cap 22. A cylindrical sleeve 18 encloses the header of the package 12. Double-cylindrical ferrule holder 19 is welded on the upper surface of the sleeve 18. The ferrule holder 19 keeps a ferrule 20 which sustains an end of the optical fiber 14 along an axial line. A conical bend limiter 21 is fitted on the ferrule holder 19. An elastic material bend limiter 21 protects the end of the fiber from excess bending.

The PD chip 1 is mounted on the insulating submount 13 for separating electrically an n-electrode (cathode) of the PD from the package (case or ground) 12. The submount 13 is a rectangular insulator board made from aluminum nitride AlN, alumina $Al_2O_3$ or the like. The submount 13 is coated on both surfaces with thin metal layers (called a metallized layer) for the convenience of soldering. The PD chip 1 is fixed on the submount 13 with e.g. PbSn solder. The upper metal layer of the submount 13 is joined to the cathode pin 16 with a gold wire. The p-electrode of the PD chip 1 is connected to the anode pin 15 with another gold wire.

The ball lens 23 ensures high efficiency entrance of light into the PD by converging the light beams transmitted from the optical fiber 14 onto the receiving surface of the PD chip 1. The end of the fiber 14 is slantingly polished with the ferrule 20 to prevent light reflected onto the fiber end from propagating back a laser which is positioned at the other end of the fiber. The slanting polishing angle is, for example, eight degrees. The slanting angle is an arbitrary parameter and is a matter of design choice. This PD module aligns all the centers of the fiber 14, the lens 23 and the PD chip 1 on the same center axis. This is the meaning of the "common axis alignment".

It seems as a matter of course that all the center axes of the optical parts coincide with each other in PD modules. The Inventors, however, have found that such a common axis alignment PD has a drawback of having a tendency of inducing interference between different frequencies in analog signal transmission. The drawback will be explained in detail. Optical CATV (cable television) is the most suitable example, because the mutual interference appears clearly in optical CATV PD modules. When an optical CATV system sends analog signals having many different frequencies to receiving sets containing PD modules, the received signals at the PD modules are sometimes distorted by the interference between signals having different frequencies. The number of channels is significantly restricted in order to avoid signal distortion in analog CATVs. Distortion occurs as follows. An optical CATV changes analog electric signals into analog optical signals by a laser (LD) or an LED and sends a plurality of light signals including different frequencies in an optical fiber to receiving sets of subscribers. The PD in the receiving set converts the optical signals to electric signals.

A unit using one frequency is called a "channel". An analog CATV station gathers the signals from a plurality of channels with different frequencies, converts the electric signals of the channels by a laser or an LED to optical signals including many analog signals and transmits the integrated signals through a fiber. The receiving set at a subscriber converts the optical signals into electric signals including many frequencies and selects one channel from the signals containing a plurality of channels. Since an analog PD module utilized analog signals, the PD must be highly linear. Linearity is one of the important criteria of analog PDs unlike digital PDs. Good linearity means that the electric signal (photocurrent I) is continually in proportion to the light power P over a wide power range in a photodiode. If the electric signal has higher order (nonlinear) terms of the light power, the signals are distorted by the interference between different frequencies in the PD. If the electric signal includes, e.g., a second order (quadratic) term of the original signals, new parasitic frequencies corresponding to a sum or a difference (beat) of two different frequencies appear in the PD output. This is the cause of signal distortion.

Distortion is a nonlinear phenomenon which appears also in all order harmonics higher than second order. The second order distortion $IMD_2$ is the largest in value and the easiest to measure among all the distortions. Usually the performance of a PD is estimated by the second order distortion $IMD_2$. The second order distortion is in proportion to the input signals. When the input signal is reduced, the $IMD_2$ is also reduced. But reduction of the input signal leads to a low S/N ratio, which prevents a TV from displaying clear images. It is difficult for conventional PD modules to operate with low distortion without sacrificing signal power.

In an effort to solve the distortion problem, the Inventors once proposed a new analog PD module which can lower distortion by exploiting the aberration of a ball lens positively. This proposal is set forth in Japanese Patent Application No. 6-171873(171873/'94) "Analog PD module and method of producing same". FIG. 3 is a schematic diagram of optical parts in an analog PD module. A PD chip 1 is fixed on a package 2 via submount. The PD chip 1, a ball lens 3 and an optical fiber 5 align in series on a straight line. The fiber end is clumped by a ferrule 4. The parts or the structure are similar to a conventional PD module. The Inventors had first noticed a possibility of reducing the distortion without sacrificing sensitivity by varying the distance Z between the lens and the end of the optical fiber. Finding out the difference of the dependence upon distance Z between the distortion and the sensitivity, the Inventors succeeded in proposing a new arrangement of the PD, the lens and the fiber for making good use of the aberration of a ball lens.

FIG. 4 is a graph showing the AC sensitivity RAC (A/W) and the second order distortion $IMD_2$ (dBc) measured by the Inventor as functions of the distance Z (mm) between the lens and the fiber. The abscissa is the distance Z (mm). The left ordinate is the AC sensitivity RAC (A/W). The right ordinate is the second order distortion $IMD_2$ (dBc). The solid line shows the sensitivity RAC. The dotted line denotes the distortion $IMD_2$. $IMD_2$ has a peak value of −61 dBc at Z=1.2 mm. Conventional modules used to pay attention to only a larger distance Z far beyond the maximum distortion point (Z=1.2 mm) for seeking low distortion. A criterion of an analog PD requests an $IMD_2$ lower than −75 dBc. The conventional PD module had adopted a large distance which first gives −75 dBc to $IMD_2$ beyond the distortion maximum point. In the example, the prior PD module disposed the fiber end at a far point distanced by Z=1.6 mm from the lens (RAC=0.89 A/W). The point of the fiber, however, was diverted far from the maximum sensitivity range (RAC= 0.96 A/W). The conventional PD module succeeded in reducing the $IMD_2$ below −75 dBc at the expense of the sensitivity. The received signals were so weak that the PD module could not properly process the signals including many channels of different frequencies. The poor sensitivity had restricted the number of channels.

The Inventors considered the possibility of reducing only the distortion without decreasing the sensitivity of PD modules and measured the $IMD_2$ and the RAC as a function of Z in a small Z region which has attracted no attention before. For the first time, the Inventors have noticed the existence of the range of a small Z which reduces the distortion faster than the sensitivity. In FIG. 4, there is a point giving $IMD_2$=−75 dBc between Z=0.8 mm and Z=0.9 mm which are far smaller than the conventional lens·fiber distance, e.g., Z=1.6 mm. Unlike the prior point Z=1.6 mm, the newly-found point between Z=0.8 mm and Z=0.9 mm can satisfy the requirements of both sensitivity and distortion. Then Japanese Patent Application No. 6-171873 gave a PD module maintaining high sensitivity and low distortion by determining the lens·fiber distance Z from Z=0.8 mm to Z=0.9 mm.

Why does the range of the maximum sensitivity broadly extend between Z=0.8 mm and Z=1.3 mm? The reason may be assumed as follows. The light receiving region enclosed by the p-electrode of a conventional PD chip has a wide area of a diameter W from 100 $\mu$m (0.1 mm) to 200 $\mu$m(0.2 mm). The ball lens converges the beams emitted from the fiber to a small spot (image of fiber end: beam waist) of a diameter U far smaller than 0.1 mm to 0.2 mm (U<W). The beams converge on the PD to a (fiber end image) spot narrower than the light receiving region of the PD. Although the distance between the PD and the lens is maintained constant, the diameter of the beams on the PD varies as the fiber end moves in Z-direction. When the fiber lies at a point which gives the smallest diameter to the beam spot (beam waist) on the PD, all the beams enter the light receiving region. The fiber position realizes the maximum sensitivity of course. Since U<W, even if the fiber is slightly displaced left or right, all the beams still enter the light receiving region of the PD and the PD enjoys the maximum sensitivity. Namely, since the diameter U of the beam waist is smaller than the diameter W of the light receiving region (U<W), the PD has a broad maximum sensitivity range from 0.8 mm to 1.3 mm.

Why does the dependence on the distance Z of the distortion $IMD_2$ differ from the dependence on the distance Z of the sensitivity? The $IMD_2$ does not peak at the center $Z_0$ (=1.1 mm) of the maximum sensitivity range but rather peaks at a farther point (1.2 mm). The previous invention succeeded in satisfying both requirements of the sensitivity and the distortion by making the best use of the asymmetry of the distortion and the sensitivity. Then why does the asymmetry occur between the sensitivity and the distortion? If a lens were to be free from aberration, the beams emitted from a light source should converge to an image point (beam waist) with a certain aperture and should diverge from the image point with the same aperture. Then the beams should be entirely symmetric both in the front direction (increasing Z) and in the rear direction (decreasing Z) with regard to the image point (beam waist), if the lens were immune from aberration. Then the distortion should also be symmetric both in the front direction and the rear direction with regard to the image point like the aperture.

However, lenses have aberration. In particular, a ball lens has a large aberration. Due to the aberration, the beams refracted by a lens cross the central axis line not at a common point but at different points distributed continually along the center axis line. The crossing points vary as a function of the radial distances of beams from the lens axis. A lens with aberration refracts far-axis beams stronger than near-axis beams. Far-axis beams cross the lens axial line earlier than near-axis beams. In short, far-axis beams converge more swiftly than near-axis beams. The farthest limit of the crossing points of near-axis beams is called "Gauss' image" point. Far-axis beams cross the axis at points closer to the lens than Gaussian image. The fiber·lens distance Z has a reciprocal relation to the lens·image distance Y which is simply denoted by the lens formula. The longer the fiber·lens distance Z becomes, the shorter the lens·image distance Y. The distortion of signal must originate from excess concentration of beams. Localized, concentrated power must induce the distortion of signals. Near-axis beams have a larger power than that of far-axis beams. Thus, the power density is the highest at Gauss' image point along the axis, because near-axis beams meet with the axis there. The Inventors suppose that when the light receiving surface of a PD happens to coincide with the Gaussian image point, the distortion is maximum, because such a disposition forces light power to concentrate at a narrow spot on the PD surface. Since dense light power hits at a narrow spot of the pn-junction, the second order or higher order effect appears on the photocurrent. The appearance of harmonics induces the intervention between different frequencies and enhances the distortion of electric signals.

If the fiber end is further pulled forward from the Gaussian image point, all the beams diverge. The beam diameter U is wider than the diameter W of the PD light receiving region (U>W). Sensitivity starts to reduce. On the contrary, when the fiber end is pushed backward toward the lens from the Gaussian image point, far-axis beams begin to converge just on the light receiving surface of the PD. The beam diameter U is smaller than the diameter W of the PD receiving region (U<W). The sensitivity maintains the maximum level for a while. The sensitivity curve remains flat at the maximum. When the fiber end is further advanced toward the lens, the beam diameter U becomes bigger than the PD receiving surface diameter W (U>W). Sensitivity starts to degrade at the point of U=W close to the lens. The sensitivity therefore keeps the same maximum for the fiber end positions from the lens-close point of U=W to the Gaussian image point. But the peak of distortion exists at the Gaussian image point. The asymmetry between the sensitivity and the distortion is perhaps caused by the discrepancy of the Gaussian image point from the middle point of the maximum sensitivity range. The forward deviation of the Gaussian image point is caused by the aberration of the lens. A ball lens has the strongest aberration among spherical convex lenses. The asymmetry between the sensitivity and the distortion therefore appears conspicuously in the PD device relying upon a ball lens. The Inventors once discovered a new PD·lens·fiber disposition which allows the PD module to suppress the distortion down to a value less than −75 dBc and to maintain the maximum sensitivity. The PD module still had axially aligning PD, lens and fiber end. Three optical parts aligned on Z-axis in the previous module. However, the fiber end approached farther to the lens. The lens·fiber distance Z was determined to be smaller than the middle point $Z_0$ of the maximum sensitivity range in FIG. 4.

FIG. 4 shows a fall of the distortion in the region nearer to the lens than $Z_0$. Namely, the fiber end did not form an image on the PD plane but formed the image on another plane which is farther from the lens than the PD in the improved module. The PD is placed at a non-focus point. Then the previous module may be named a "defocus type" module and the principle supporting the PD module may be called a defocus method. The axial defocus ($Z<Z_0$) alleviated the distortion without degrading the sensitivity.

At the beginning of optical CATV, a small number of channels could satisfy demand. The present optical CATV is usually provided with 40 channels for transmitting signals as a standard. Future optical CATV will further require the system of transmitting signals of 80–110 channels. The requirement for the number of channels is increasing. The reception frequency band of receiving sets has been 450 MHz till now. However, the increase of the channel number will demand 860 MHz for the frequency band of receiving sets instead of 450 MHz. Thus, the frequency band must be doubled in the optical CATV in the near future. The development of CATV increases the number of subscribers. The area of transmission is further widened. The broadcasting station uses high power laser diodes (LDs) for sending signals of many channels to a great number of houses of subscribers. Since high power lasers emit strong beams, more than 1 mW of light power sometimes shoots the PDs of some subscribers which are close to the station. The distortion is severe in the PD modules, since high power light and a great number of channels emphasize the distortion of signals. High power light from strong lasers may alleviate the need to enhance sensitivity but intensifies the need to lower distortion. This tendency for more channels and wider area for optical CATV systems makes it necessary to reduce the distortion of PD modules at the subscriber end. Further, prevalence of optical CATVs requires more inexpensive and more sophisticated PD modules. It is a matter of urgency to produce low-distortion, high sensitivity and stable photodiode modules.

SUMMARY OF THE INVENTION

One purpose of the present invention is to provide a photodiode module which is immune from distortion even for large power light signals. Another purpose of the present invention is to provide a photodiode module having both low distortion and high sensitivity. A further purpose of the present invention is to provide a method of making a low-distortion PD module at a low cost. The fourth purpose of the present invention is to provide a method of producing a low-distortion PD module with a high yield.

Since the end of an optical fiber is obliquely cut at a certain angle θ, the beam propagating in the fiber refracts at a slanting angle α to the axis on the end surface and progresses to the slanting direction at α to the axial line. This invention proposes a photodiode module arranging the center (H) of a lens and the center (O) of a PD chip on an extension of the slanting beam emitted from the oblique end surface (Q) of the fiber. Ideally, a slanting line starting from the fiber end and crossing at α with the axis pierces the center (Q) of the fiber end, the center (H) of the lens and the center (O) of the PD. A virtual direct beam emitted and refracted on the end surface (Q) of the fiber penetrates the lens center (H) and the PD center (O) without bending. Namely, QHO is a straight line which inclines at α to the axis of the fiber. The fiber axis deviates from the lens axis in one direction. The PD axis deviates from the lens axis in the other direction. The axes of three optical parts are parallel but are separated from each other. Thus, this type is referred to as an "off-axis" type PD module in comparison with the former defocus type PD module. The above is an ideal PD module according to the teaching of the present invention. In practice, size errors, mounting errors and other errors accompany the production of PD modules. But at least the line OH must be parallel to the slanting beam emitted from the oblique fiber end. Since the fiber center (Q) is determined by alignment of the fiber, line QH is not necessarily parallel to the slanting beam from the fiber end due to the errors. Ideally, line QH should also be parallel to the slanting beam emitted from the fiber.

When the center (H) of the lens is positioned at a point on the central axial line standing on the package, the center (O) of the photodiode should deviate by $-L \tan \alpha$ from the center of the package in a certain direction which is designated by "$-X$" direction according to the teaching of the present invention, where L is the axial distance between the lens center (H) and the photodiode PD and $\alpha$ is the slanting angle of the beam going out of the fiber to the axial line. On the contrary, the center (Q) of the fiber should deviate from the axial line by about $Lf \tan \alpha$ in the reverse direction ($+X$ direction), where Lf is the axial distance between the lens center (H) and the fiber end (Q). The distances L and Lf are determined by a "defocus" condition of putting the PD at a point at which the beams emitted from the fiber have not fully converged yet by the lens. Namely, Lf is shorter than the distance between the lens center and the Gauss image point of the fiber by the lens.

Furthermore, the orientation of the fiber should be determined by rotating the fiber for bringing the lowest point (S) nearest to the axis and the highest point (T) farthest to the axis. In the orientation, the central beam refracted at the end of the fiber passes straight through the lens center (H) and arrives at the center (O) of the PD chip without being bent by the lens. The orientation of the fiber is as important as the reciprocal deviations of the PD and the fiber for this invention. The fact that the acute edge (S) is the nearest and the obtuse edge (T) is the farthest to the center line ZH is now called "iso-orientation". FIG. 5 shows the iso-orientation. On the contrary, when the obtuse, upper edge (T) is the closest to ZH and the acute, lower edge (S) is the farthest to ZH, the relative position is called "aniso-orientation", as shown in FIG. 6.

The above is the principle of the present invention. The distances L and Lf are not symmetric parameters. The lens-PD distance L is a constant precisely predetermined by the height of the cap of the package. Lf is an inherent parameter determined by the adjustment of the fiber for reducing the distortion and raising the sensitivity for individual chips. When L and $\theta$ are known parameters, the off-axis position of the PD should be determined for minimizing the distortion of signals by deviating the PD by $-L \tan \alpha$. This invention also separates the fiber from the center line for reducing the distortion. The previous improvement by the Inventors was called a "defocus" type. The present arrangement may be called an "off-axis" type PD module. "Off-axis", "iso-orientation" and "defocus" characterize the disposition of the present invention. Why can the off-axis deviation of the PD and the fiber depress the distortion? The reason that the distortion is reduced by the radial displacement of the fiber and the PD is now clarified.

This Inventors have produced a lot of defocus type PD modules which have a fiber closer to the lens than the image point of the PD in accordance with the teaching of the previous invention. The production of the defocus type PD modules has brought an interesting matter to the Inventors' attention. Fluctuation of latent production conditions made some PD modules have a better distortion property than a standard one but other PD modules have a worse distortion property than the standard one. What causes the differences of distortion properties among the various defocus type PD modules? The dotted curve of FIG. 4 shows the change of the distortion $IMD_2$ as a function of the lens-fiber distance Z. Is there any other parameter having an influence upon the distortion than the lens-fiber distance Z? If there were no other parameter affecting distortion, it would be difficult to understand the large fluctuation of the distortion property of the defocus PD modules.

In an effort to determine the reason for the variance of the distortion properties, the Inventors dissected some defocus PD modules having large distortion and other defocus PD modules having small distortion. By the dissection analysis, the Inventors found an unexpected fact that PD modules of small distortion have a deviating PD chip and a deviating fiber in the reverse directions in which the lowest edge (S) is the closest but the highest edge (T) is the farthest to the center line ZH as shown by FIG. 5. PD modules of large distortion have a deviating PD chip and a deviating fiber in the reverse directions in which the lowest edge (acute) (S) is the farthest and the highest edge (obtuse) (T) is closest to the center line ZH as shown by FIG. 6. Namely, better PD modules have the orientation (iso-orientation) of the fiber in FIG. 5. Worse ones have the orientation (aniso-orientation) of the fiber in FIG. 6. In FIG. 5, a central beam goes along the points (Q), (H) and (O) aligning on a direct line. In FIG. 6, a central beam propagates along a bent path which passes a periphery of the lens. Other PD modules having a medium degree of distortion, in general, have a fiber and a PD chip just aligning on the center line. Then, the Inventors understood that the dotted line of FIG. 4 denotes the distortion of the PD modules having the PD and the fiber just on the central line and that off-axis deviation of a PD and a fiber would bring an unknown effect to the distortion property. The PD module of FIG. 5 and the PD module of FIG. 6 may be identical from the view point of making defocus type modules, since L and Lf are common distances for both FIG. 5 and FIG. 6. The defocus type improvement deems the PD module without off axis deviation ideal. But unavoidable errors in manufacturing often induce off-axis deviation of PDs, lenses and fibers in vertical directions. The module of FIG. 5 and the module of FIG. 6, however, are different from the standpoint of beam analysis. The difference of beams will be analyzed by geometric optics.

FIG. 9 demonstrates the relation between the oblique-cut angle $\theta$ and the slanting angle $\alpha$ of the central beam to the fiber axis. (S) is the longest end and (T) is the shortest end of the fiber. The central beam RQ spreading along the fiber axis is refracted at the oblique-cut surface ST toward (S) into the beam line QM. The central beam depicts a locus RQM. QM meets at the slanting angle $\alpha$ with the extension QU of the fiber axis RQ. The end surface ST is deviated by $\theta$ from a vertical end plane. Qn is a normal standing on the oblique end surface TS. For the central beam RQM, Snell's law requires $$n_1 \sin(\alpha+\theta) = n_2 \sin \theta. \qquad (1)$$

Here $n_1$ is the refractive index of air and $n_2$, is the refractive index of the fiber core. Eq. (1) teaches us $$\alpha = \sin^{-1}\{(n_2 \sin \theta)/n_1\} - \theta. \qquad (2)$$

$\theta$ uniquely determines $\alpha$.

FIG. 6 shows the orientation of parts which enhances signal distortion. The center (H) of the lens lies on the Z-axis which is defined as a parallel line with the fiber. The center (Q) of the fiber end deviates in a direction from the Z-axis. The center (O) of the PD also deviate in the reverse direction from the Z-axis. The uppermost point (T) on the fiber end is the closest to Z-axis. The bottom point (S) on the end is the farthest to the Z-axis. The orientation of the oblique-cut end of the fiber is reverse to the module in FIG. 5. The center (Q) of the fiber end, the center (H) of the lens and the center (O) of the PD align nearly on a straight line. The central beam is refracted at an angle $\alpha$ outward toward (S) on the oblique-cut end ST. The beam goes into a peripheral part of the lens and is refracted strongly inward by the lens as a far-axis beam. The beam goes out of the lens with an oblique angle more than $\alpha$ to the axis. Then the beam enters the center (O) of the PD. FIG. 6 is similar to FIG. 5 at the point that the image of the fiber end is formed by the lens at the center (O) of the PD. However, the path of the beam of FIG. 6 is entirely different from the path of FIG. 5, because of the reverse orientation of the fiber end. Geometric optics would ignore the difference of the paths and would be unable to find the influence upon the signal distortion, since the powers arriving at the PD are equal both for FIG. 5 and FIG. 6.

The Inventors have considered the origin of the asymmetry of the orientations of FIG. 5 and FIG. 6. If the distortion is not symmetric to the central axis (Z-axis), the asymmetry must be caused from some asymmetric parts. Both the ball lens and the PD are symmetric parts. The origin of the asymmetry must be attributed to the optical fiber, since the fiber has an oblique-cut end polished at 4 degrees to 10 degrees for preventing the reflected beams from returning to the laser as a light source. The orientation of the polished end of the fiber seems to control the distortion property. The difference of the orientations of the oblique-cut ends makes a big difference of beam paths. Of course, in both cases, the beams all converge to the center (O) of the PD, since the lenses make an image of the fiber end (Q) to the center (O) of the PD. However, light emitted from the fiber cannot be represented fully by a single central beam. In practice, plenty of diverging beams are emitted in an imaginary light cone from (Q) point of the fiber end. The light cone is defined by an axis of the central beam, a top point (Q) and a top angle $\gamma$. The top angle $\gamma$ depends upon the refractive indices of the core and the cladding of the fiber.

If the lens had no aberration, all the beams once diverged in the light cone would be converged at the center (O) of the PD chip by the lens. Lenses, however, have aberration. In particular, ball lenses have very large aberration. Near-axis beams converge slowly at a far point (Gauss image point) away from the lens, but far-axis beams converge quickly at a close point to the lens. The converging points are different for beams in the light cone and are contingent upon the points at which the beam goes into the lens. The converging points are different for FIG. 5 and FIG. 6. FIG. 5 allows the beams to go into the PD at nearly right angles, since the central beam passes the lens center (H). The distribution of the arriving beams is nearly symmetric with the center (O) on the PD surface in FIG. 5. The PD senses uniformly distributed beams.

The orientation of FIG. 6 forces the beams to shoot the PD slantingly from external directions. The beams slantingly shoot the PD at acute angles far different from 90 degrees. Since the beams enter the PD at a slant, the density of arriving beams at a left region of (O) differs far from the density at a right region of (O). The fluctuation of the beam power density has little influence upon the sensitivity but has a great influence on the distortion. The inclination of the beams has a strong tendency of dispersing the incident beam power density. The power density of beams is high at some regions but the power density is low at other regions. The fluctuation of beam density is serious on the surface of the PD. The strong fluctuation of beam power may induce interactions among different frequencies which cause strong signal distortion in the orientation in FIG. 6.

The Inventors have assumed such a hypothesis that fluctuation of beam density should induce distortion in a PD. The hypothesis has been verified by a simulation based upon the beam tracking analysis. Assuming that a certain number of beams should be emitted from the fiber with a uniform probability for solid angle into the light cone, the analysis traces all the paths of the individual beams from the fiber through the lens to the PD on geometric optics. The analysis calculates the spot of entrance of each beam to the lens, the path in the lens, the spot of emergence of the beam and the spot of entrance on the PD rigorously. Since the method traces the loci of all the beams, the method is called the beam tracking analysis. Geometric optics can be applied to the refraction at the surface of the lens for calculating the loci of the beams. FIG. 7 exhibits the distribution of the incident beams on the PD for the orientation of FIG. 5. FIG. 8 shows the similar beam distribution on the PD for the orientation of FIG. 6. The spot distribution of FIG. 7 and FIG. 8 is not a result of experiments but a result of calculation by the beam tracking analysis under the assumption of equal probability of dispersion of beams in the light cone.

The deviation of the center (O) of the PD chip from Z-axis is denoted by X. The deviation of the center (Q) of the fiber from Z-axis is designated by W. The signs (+or −) of X and W are defined as that W is negative and X is positive (W<0, X>0) when the lowest point S is farther from Z-axis than the upper point (T), as shown in FIG. 6. Namely, the left-directed arrow shows the positive x-direction in FIG. 6. Since three points (Q), (H) and (O) align on a straight line and (H) lies on Z-axis, the sign of W is always different from the sign of X. On the contrary, W should be positive and X should be negative (W>0, X<0) when the lowest edge (S) is closer to Z-axis than the upper edge (T), as shown in FIG. 5. The right-directed arrow denotes the positive x-direction in FIG. 5. In FIG. 5 to FIG. 8, for example, the ball lens has a diameter of 1.5 mm and a refractive index of 1.5. The focal length of Gauss image for the ball lens is 1.12 mm. If the distance Lf between the lens center and the fiber (object) is Lf=1850 $\mu$m or Lf=1650 $\mu$m, the Gauss image is formed at a point distanced from the lens center by 3000 $\mu$m or 3500 $\mu$m.

Preferable parameters in FIG. 5 are W=120 $\mu$m (fiber deviation), X==140/$\mu$m (PD deviation), Lf=1850 $\mu$m (lens-fiber distance) and L=2100 $\mu$m (lens-PD distance), $\alpha$=3.7° and $\theta$=8°. Since L=2100 $\mu$m is shorter than 3000 $\mu$m, the PD is positioned far away from the Gauss image point (defocused). FIG. 7 demonstrates the distribution of dots on the PD surface of close-axis beams in the orientation of FIG. 5. The abscissa is X-axis (right-hand positive) and the ordinate is Y-axis (upper positive). Z-axis meets at right angles with both X-axis and Y-axis at the origin (O) (center of the PD). Each dot means an incident point of each one of individual beams. The circle C represents the area of the light receiving region of the PD. In FIG. 7, the dots of incident beams are uniformly dispersed within the circle C. The left half region of minus X has quite a similar distribution to the right half region of plus X. The lower half region of minus Y has a similar distribution to the upper half region of plus Y. The beam dots are dispersed isotropically in XY-plane. The distribution of dots is uniform, being free from excess concentration.

It is wrong to think that it should be a reasonable result of the nearly orthogonal incidence of beams as shown in FIG. 5. The fact is entirely contrary. If the lens had no aberration, all the beams emitted from (Q) would be converged just at the center (O) of the PD. Thousands of beams would be gathered at the spot (O) by the aberration-free lens. The excess convergence on the point (O) would cause large signal distortion through an excess interaction among different frequencies. Therefore, an aberration-free lens would maximize the distortion just at the point of maximum sensitivity and would make a symmetric distribution of beams in front of and at the back of the image spot of the fiber end. An aberration-free lens raises the distortion in proportion to the sensitivity of a PD. Thus, it is difficult for an aberration-free lens to suppress the distortion without sacrificing the sensitivity of a PD.

The consideration teaches us that it is the lens aberration to yield the asymmetry between the sensitivity and the distortion indicated in FIG. 4. The separation of the distortion from the sensitivity results from the use of an aberration-rich ball lens. In the defocus disposition of FIG. 3, since the fiber is positioned at a point closer to the ball lens than the image point of the PD, Gauss' image point is built at a point farther from the lens than the light receiving surface of the PD. The converging point differs from the PD center (O). The near-axis beams are not converged at the PD surface yet. The beams then disperse uniformly on the PD surface. The uniform dispersion of beams can decrease the distortion by lowering the mutual interaction among different frequencies. Besides the low distortion, the sensitivity is high in the defocus disposition explained by FIG. 3 and FIG. 4, since nearly all the beams go into the region encircled by (C) with a uniform beam density.

Such a mysterious improvement is realized by an aberration-rich lens and a defocus position of the PD. The reduction of the distortion of the defocus type relies upon both the lens aberration and the PD defocus. However, it is not always true that the improvement of the distortion should be accomplished by an aberrant lens and a PD position closer to the lens than Gauss' image point. Here Gauss' image point is now defined by showing a converging formula. "A" is the distance between the ball lens center and the object. "B" is the distance between the ball lens center and Gauss' image point. Then $A^{-1} + B^{-1} = 2(n-1)/nR$. The focal length is $nR/2(n-1)$ for Gauss' image of a ball lens, where R is the radius of the ball lens and the n is the refractive index. Gauss' image point can be definitely calculated on the formula. The focal length of the ball lens is different from a focal length ($R/2(n-1)$) of a thin lens of course. Various errors often complicate the manufacturing of the defocus type PD modules. PDs or fibers are often fixed at spots deviating from the axial line by errors. The off-axis errors of PDs or fibers sometimes reduce the distortion but other times raise the distortion.

FIG. 8 shows the distribution of the dots of incident beams on the PD by far-axis beams of FIG. 6. The fiber deviates in -X direction and the PD deviates in +X direction. It means that the lowest edge (S) is farther from Z-axis than the upper edge (T). The parameters in the example of FIG. 6 are W=-160 $\mu$m (fiber deviation), X=+140 $\mu$m (PD deviation), Lf=1650$\mu$m (lens-fiber distance), L=2100 $\mu$m (lens-PD distance), $\alpha$=3.7° and $\theta$=8° Almost all the beams are included within the circle (C), which ensures a high sensitivity. But the density is irregular in FIG. 8. A crescent GJEF near point (J) is free from the dots. No beams arrive at the crescent. High density of dots exists within a region EFGKON. The right-hand region of X <0 is sparsely populated with the beams. The distortion is caused by the high concentration of beams within the region EFGKON.

The orientation of FIG. 6 does not make a uniform distribution but yields excess high concentration of beams on the PD. The excess concentration induces the mutual interaction among frequencies and raises the distortion. Since almost all the beams are absorbed within the circle (C), the sensitivity is high. But the distortion in the example of FIG. 6 is large due to the localized excess population of beams, as shown in FIG. 8. The distortion increases in proportion to the excess density of beams. However, it is not easy to prophesy how the excess density would be yielded.

The pure defocus module of FIG. 3 having the fiber and the PD just on the Z-axis shows a medium dot dispersion between FIG. 7 and FIG. 8. The example of FIG. 7 has a smaller distortion than the example of FIG. 3 having the fiber and the PD on the lens axis (Z-axis). The other example of FIG. 8 has a bigger distortion than the example of FIG. 3. The best example of FIG. 7 succeeds in reducing the distortion by dispersing uniformly the incident beams in the receiving region of the PD by taking advantage of the big aberration of a ball lens.

The above fact is deduced by comparing three typical examples of FIG. 5 (W>0), FIG. 6 (W<0) and FIG. 3 (W=0). Besides these three cases, other examples have been investigated further for seeking a clear relation between the off-axis deviation and the distortion. The off-axis deviation X of PDs from the Z-axis is adopted as a ruling parameter. Adoption of X is equivalent to employ W as a parameter, because W is uniquely determined by X. Three points (Q), (H) and (O) are aligned on a direct line. The lens-fiber distance Lf and the lens-PD distance L are adjusted for tuning the sensitivity for 1.3 $\mu$m light to be 0.9 A/W. In all the examples, the PD surface is positioned closer to the lens than Gauss' image point of the fiber by the lens. Namely, all the examples are defocused in accordance with the thought of the prior application of the Inventors. All the other parameters L, Lf and W change as functions of X under the above conditions. The fiber is a single-mode quartz fiber suitable for 1.3 $\mu$m to 1.55 $\mu$m. The slanting polishing angle of the fiber end is 8°. The core refractive index is $n_1$=1.5. The output angle is $\alpha$=3.7° from Eq.(2).

FIG. 10 shows the result of the measurement of $IMD_2$ by changing the deviation X of a PD. The abscissa is the deviation X of a PD. The ordinate is the second order distortion $IMD_2$. As mentioned before, X is defined as positive when the lowest edge (S) of the fiber end is farther to Z-axis than the upper edge (T). Namely, X is positive for FIG. 6 and negative for FIG. 5. The direction of a vector ST projected on XY-plane is the direction of a positive X.

X=-140 $\mu$m gives the minimum distortion of -86 dBc. This case corresponds to the orientation of FIG. 5 in which W=+120 $\mu$m, Lf=1850 $\mu$m and L=2100 $\mu$m. X=-150 $\mu$m to -100 $\mu$m give sufficiently low distortion less than -85 dBc.

A simple defocus type of FIG. 3 (X=0) without off-axis deviation gives $IMD_2$=-79 dBc. The simple defocus is inferior in distortion to the defocus+off-axis type of FIG. 5. In the range of (X=-200 $\mu$m, to X=+50 $\mu$m, the distortion $IMD_2$ is less than -75 dBc. Less than -75 dBc is a traditional requirement for $IMD_2$. The range from X=-200 $\mu$m, to X=+50 $\mu$m satisfies the traditional requirement. However, the requirement will be more rigorous for $IMD_2$. When X crosses the point X=0, the $IMD_2$ increases steeply. X=+140 $\mu$m corresponds to the typical orientation of FIG. 6 in which W=-160 $\mu$m, Lf=1650 $\mu$m and L=2100 $\mu$m. The distortion is -59dBc for X=+140 $\mu$m.

Attention should be paid to positioning a PD chip upon a package for practicing this invention. The simplest way (①)

is fixing the PD chip at a point deviating by $-L \tan \alpha$ from the center P of the package and positioning the lens just above the center P of the package. An alternative (②) is fixing the PD chip at the center P and positioning the lens at a point deviating by $+L \tan \alpha$ in X-direction from the center P of the package. Another choice (③) is fixing the PD chip at an arbitrary spot B on the package and positioning the lens at a point deviating by $+L \tan \alpha$ in X-direction from the chip spot.

The three ways can be expressed simply by the following conditions;

| | | |
|---|---|---|
| ① center of PD | $O = -L\tan\alpha$, | center of lens $H = 0$. |
| ② center of PD | $O = 0$, | center of lens $H = +L\tan\alpha$. |
| ③ center of PD | $O = \beta$, | center of lens $H = \beta + L\tan\alpha$. |

The orientation of the fiber has been known by the slanting end ST. The position of the fiber cannot be a priori determined. The optimum position of the fiber in the X-direction is actually determined by moving in parallel in XY-plane and axially in the Z-axis for seeking the spot of the minimum distortion and the maximum sensitivity.

The optimum position of the end Q of the fiber should be,

①$Q = Lf\tan\alpha$
②$Q = Lf\tan\alpha + L\tan\alpha$
③$Q = Lf\tan\alpha + L\tan\alpha + \beta$ for the three cases. Lf cannot be determined a priori, since the fiber is aligned also in Z-direction for minimizing the distortion as well as in XY-plane.

The next problem is why the difference of the orientation of the fiber induces such a conspicuous difference of the beam distribution on the PD. The result of the calculation based upon the beam tracking analysis is shown in FIG. 7 (iso-orientation) and FIG. 8 (aniso-orientation). The figures visually exhibit the dispersion of beams on the PD. But the figures do not teach us the reason why the population of the beams is different. The non-uniformity of the beam dispersion in FIG. 8 for the case of FIG. 6 is explained by referring to FIG. 13. FIG. 13 shows the loci of the beams emanating from the fiber end (Q), penetrating through the ball lens (H) and shooting the PD chip. The dispersion of beams is exaggerated for clarifying the difference of the loci. The beams emanating in the slanting direction of an angle α from the fiber have an aperture of a cone shape. The half aperture angel $\gamma$ is given by $\sin \gamma = (n_1^2 - n_2^2)^{1/2}$, where $n_1$ is a refractive index of the core and $n_2$ is a refractive index of the cladding. In the case of the slanting emanation, the beams spread in a similar aperture having the same conical top angle 2γ.

Emanating from (Q), the beams are refracted at various angles by the ball lens and converge (cross the central axis QbHmFb) at different points. The beams passing more remote parts of the lens converge earlier and the beams penetrating central parts of the lens converge later. The loci of the beams refracted at points a, b, c, d, e, f and g taken on the surface of the ball lens are considered. The beams passing the central axis QbHm converge latest at the Gauss image point Fb which is the farthest point. Near-axis beams Qcl and Qan converge at point Fe which is the next farthest point. A medium beam Qdk crosses the axis at Fd which is nearer to the lens than Fc. Another medium beam Qej crosses the axis at point Fc being closer to the lens than Fd. An outer beam Qgh penetrating a peripheral part gh converges at point Fg which is the closest point to the lens. A packet of beams which pass an outer part of the lens are refracted by the lens stronger and are converged at a spot closer to the lens. Another packet of beams which pass a central part of the lens are refracted weaker and are converged at another spot farther from the lens. Though all the beams start at the single point (Q), the converging points are different. This is the aberration of the lens. For example, the near-axis beams passing near (H) in FIG. 5 go into the lens at point a to point b and go out from the lens at point m to point n in FIG. 13. The beams converge between point Fb and point Fc.

The prior discovery of the Inventors (Japanese Patent application No. 6-171873) teaches us that the distortion is reduced by positioning a PD at a point in front of Gauss' image point at which near-axis beams converge.

For the near-axis beams of the iso-orientation of FIG. 5, the PD is positioned at pq in FIG. 13. Since the iso-orientation beams on FIG. 5 are uniformly dispersed within ab on the lens and within mn on the lens, the distribution of beams is also uniform within pq in FIG. 13. Thus, the beam distribution is uniform for FIG. 5 as shown in FIG. 7.

On the contrary, the fiber of FIG. 6 has a slanting end facing the reverse direction. The fiber end emits the beams outward. The beams Qg to Qf refracted outward pass the peripheral part between "gh" and "fi" far from the center (H) in the lens. The beams going out from the peripheral part hi are severely refracted and enter the PD positioned at sr in FIG. 13. All the beams between "hs" and "is" are converged at point s on the PD. The excess concentration at "s" corresponds to the overpopulation of beams at the region EFGKON in FIG. 8. The big concentration at the region is caused by the partial convergence of beams between "hs" and "is" at point "s".

A ball lens makes an outer beam and an inner beam meet at a point e.g., "s" which is closer to the lens than Gauss' image point and is separated away from the axis. The defocus method fixes the PD at a point of the local excess population like "sr". All the beams sandwiched between Qf and Qg converge at point "s". The excess accumulated power of the converged beams at s induces the intervention among different frequencies and raises serious distortion $IMD_2$ in the PD placed at "sr". Far-axis beams induce such an excess concentration at some point due to the strong refraction by the ball lens. On the contrary, near-axis beams do not cross with each other before they arrive at Gauss' image point. No occurrence of mutual crossing endows near-axis beams with uniform distribution on the PD which is placed at a point nearer to the lens than Gauss' image point. This is a simplified reason of the occurrence of the asymmetry of distortion between near-axis beams (iso-orientation) and far-axis beams (aniso-orientation). The change of the input points from b via c, d, e, f to g at the front surface of the lens corresponds to the increment of the PD deviation X from $-140 \mu m$ to the positive direction in FIG. 10.

An intuitive clarification has been done for asymmetric occurrence of distortion. The distortion is enhanced for far-axis beams (FIG. 6) because the beams passing the peripheral part of the lens converge at a narrow region on the PD and enhance the power density there anomalously. The distortion is weak for near-axis beams (FIG. 5) because the beams passing the lens center (H) do not cross with each other and make no excess power density. As long as all the beams enter the PD, the PD has the maximum sensitivity. But the distortion depends upon the fluctuation of the distribution of beams. This invention takes advantage of the strong aberration of a ball lens to decrease the distortion still less than the simple defocus method which has been disclosed by the prior application. The large aberration of a lens is not an obstacle but a benefit for reducing the distortion in the present invention.

This invention teaches an "off-axis" plus "defocus" displacement of optical parts in a PD module for decreasing the distortion. The off-axis displacement disperses beams uniformly on the PD front surface and extinguishes excess concentration of input power at a narrow region. This invention enables us to manufacture PD modules of low distortion of $IMD_2$ = −80 dBc to −85dBc. The distortion is so small that the PD modules can be adopted for analog signal receivers of optical CATV systems having more than 100 channels. The PD modules can also be utilized as digital signal receivers for large optical power.

This invention can be practiced in a practical manner. A clear asymmetry is produced on a package by fitting a PD chip at a point deviating by a certain distance from the center on the package. The orientation ST of the fiber is known e.g. by the mark 51. The rotation adjustment can be omitted or be simplified by orienting the fiber in the direction of the asymmetry of the PD. The parallel displacement or the parallel displacement plus the rotation adjustment within 90 degrees can satisfy the requirement of the distortion of less than −75 dBc. The omission or the simplification of rotation adjustment is advantageous, because the rotation adjustment is inherently time-consuming.

DETAILED DESCRIPTION OF THE PREFERRED EMBODIMENTS

This invention provides excellent PD modules which are nearly immune from distortion by a new method of assembly without using special parts, materials or lenses. Low distortion is the most desirable property for analog PD modules for which the distortion has been the most serious drawback. The evils of the distortion have been described on analog signals and analog PDs until now. In addition to the application to analog PDs, this invention is applicable to digital PDs which receive high power light signals. The distortion is also caused by strong light power even in digital PDs. The application of the present invention enables digital PDs to regenerate more precise waveforms by levelling the light power density on PD surfaces. Namely, this invention can provide suitable receivers with low-distortion PDs for both analog and digital signals. The PD module of the present invention consists of a PD and a module. Then, the PD itself and the PD module will now be explained separately.

[EMBODIMENTS OF PD CHIPS]

Figure 1:
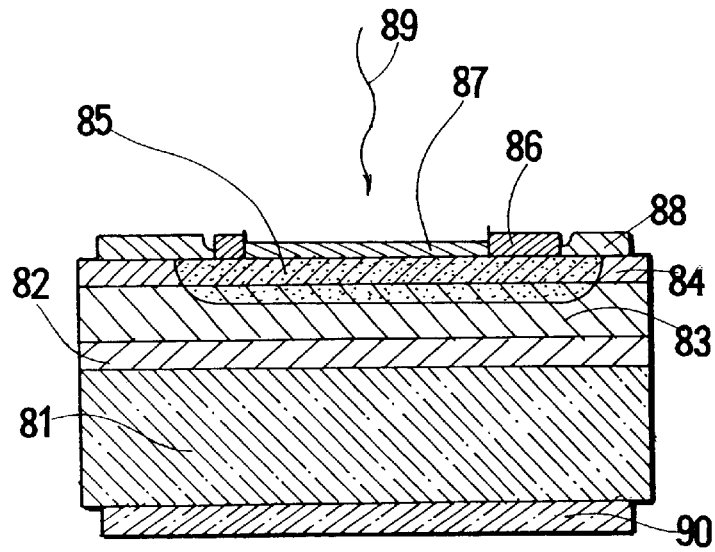
FIG. 1 is a sectional view of a prior PD chip which is available to realize the present invention.

Conventional photodiode chips are applicable to the present invention. This invention is not an improvement of a PD itself. FIG. 1 is a sectional view of a conventional photodiode chip. The substrate 81 is a part of an n-InP single crystal wafer. An epitaxial wafer is produced by depositing epitaxially an n-InP buffer layer 82, an n-InGaAs light receiving layer 83 and an n-InP window layer 84 on the n-InP substrate 81. A passivation film 88 is deposited on the n-InP window layer 84. Pn-junctions are produced by perforating holes by etching the passivation film selectively at centers of individual units and diffusing zinc atoms as a p-type impurity through the holes into the central parts of the n-InP window layer 84, the n-InGaAs layer 83 of the units and converting them into a p-InP window layer and a p-InGaAs light receiving layer. The interface between the n-InGaAs layer and the converted p-InGaAs layer is the pn-junction. The p-side top surface of the p-InP window layer is covered with an antireflection film 87 of a dielectric transparent material e.g., SiON or SiNx for preventing light from being reflected at the surface. The antireflection film 87 is an assembly of dielectric films with the thicknesses and the refractive indices which allow 1.3 μm light or 1.55μ light to pass the top surface without reflection.

Otherwise, the InGaAs light receiving layer can be replaced by an InGaAsP light receiving layer. InGaAsP has a shorter absorption edge wavelength of $\lambda g=1.4$ μm than InGaAs. The InGaAsP light receiving layer gives the PD the wavelength selectivity which is sensitive only to 1.3 μm but insensitive to 1.5 μm to 1.6 μm.

A p-electrode 86 is deposited per a unit in a ring or in a dot on the p-region diffused with zinc. An n-electrode 90 is deposited on the bottom n-InP substrate 81. The p-electrode 86 and the n-electrode 90 are reversely biased for making a strong electric field at the pn-junction. Incident light 89 comes through the antireflection film 87 into the light receiving region enclosed by the passivation film 88. Penetrating through the InP window layer without loss, the light is absorbed in the InGaAs light receiving layer 83, because the light energy is bigger than the band gap of InGaAs. The light produces pairs of electrons and holes in the InGaAs. A photocurrent flows from the n-electrode 90 to the p-electrode 86, because electrons are pulled to the n-electrode 90 and holes are pulled to the p-electrode 86. The photocurrent is in proportion to the light power.

An optical CATV receiver set requires a high speed response of more than 1 GHz for the photodiode (PD). Thus, the diameter of the light receiving region of the PD is determined to be 70 $\mu$m to 100 $\mu$m. FIG. 1 shows such an example of a photodiode.

Figure 11:
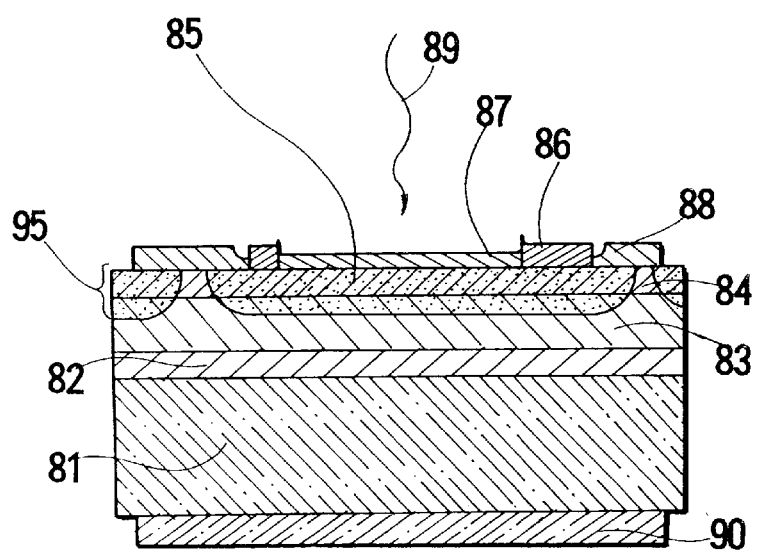
FIG. 11 is a sectional view of the PD chip having peripheral p-regions for prohibiting the occurrence of the signal delay by stray light which was proposed by Japanese Patent Application No. 2-230206 of these Inventors.

FIG. 11 shows a further improved PD chip proposed in Japanese Patent Application No. 2-230306 (230306/'90 ) by the Inventors. The peripheral parts 95 are doped with zinc at the same time of the diffusion of zinc to the central p-region 85. The p-type peripheral parts 95 are separated from the central p-region 85 by the n-type InP window layer 84. Double pn-junctions perfectly insulate the p-type peripheral part 95 from the p-type central p-region 85. Even if stray light comes into the peripheral 95 and produces extra pairs of electrons and holes there, the extra electrons cannot go to the n-electrode 90 and the extra holes cannot arrive at the p-electrode 86. The extra electrons and holes vanish soon in the p-type peripheral part 95 without joining the photocurrent. If the extra carriers drifted to the n- and p-electrodes, a retarded photocurrent would flow and would delay the response of the PD. The p-type peripheral part 95 raises the speed of the response by absorbing extra carriers which have been yielded by stray light at the peripheries. The improvement of FIG. 11 is preferable to the PD of the receiver set of an optical CATV having a further increasing number of channels.

[Embodiments of PD Modules]

Figure 2:
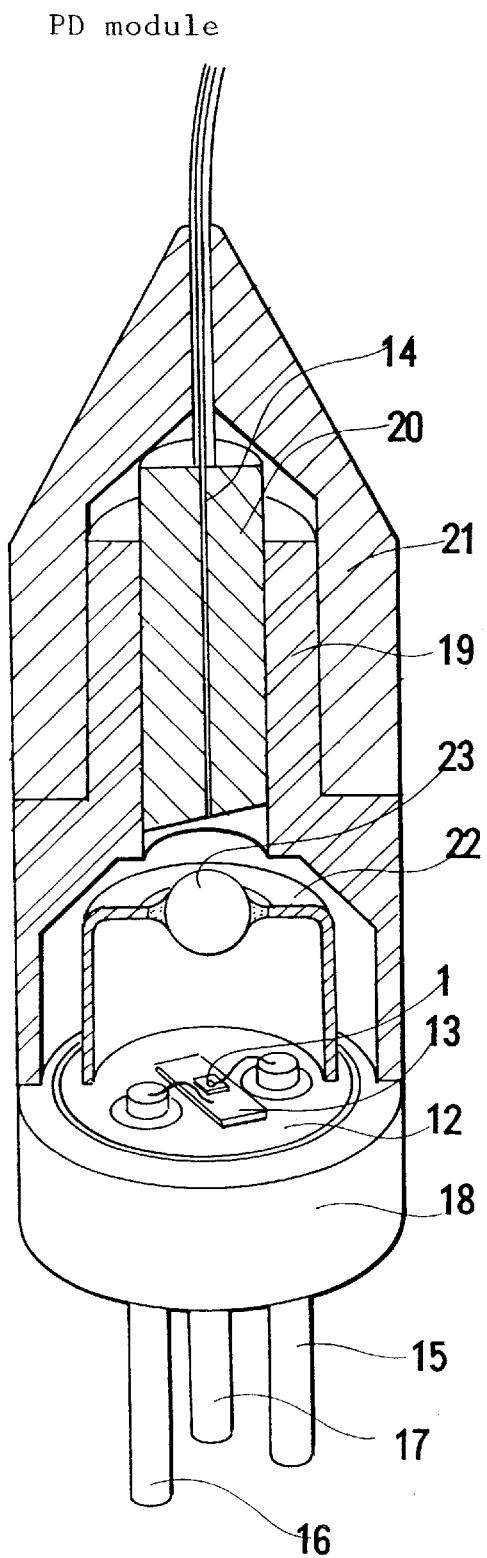
FIG. 2 is a sectional view of a prior photodiode (PD) module.
Figure 3:
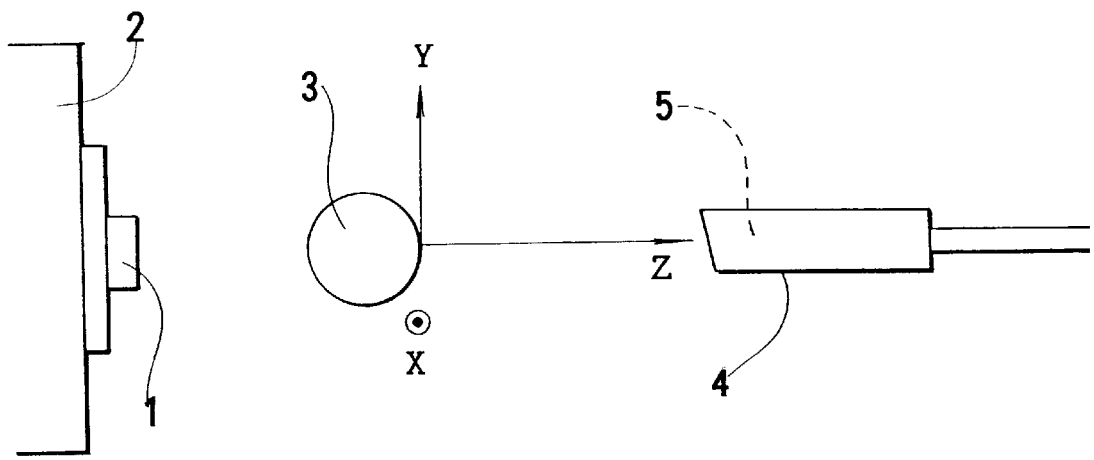
FIG. 3 is a simplified side view of a defocus type PD module which was disclosed by a prior application No. 6-171873 of the Inventors. The fiber, lens and the PD chip are aligned on the axial line.
Figure 12:
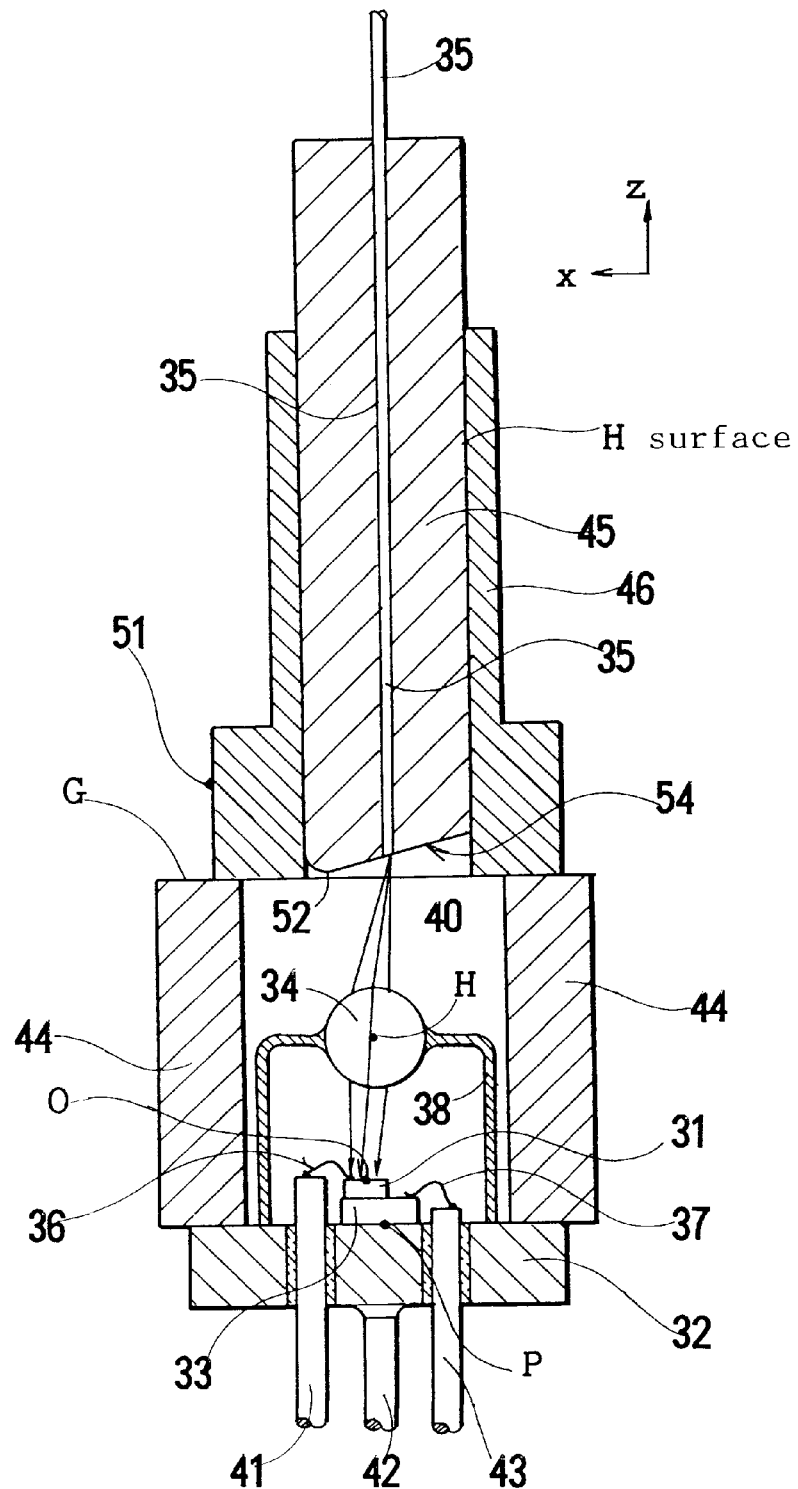
FIG. 12 is a sectional view of an embodiment of a PD module.
Figure 13:
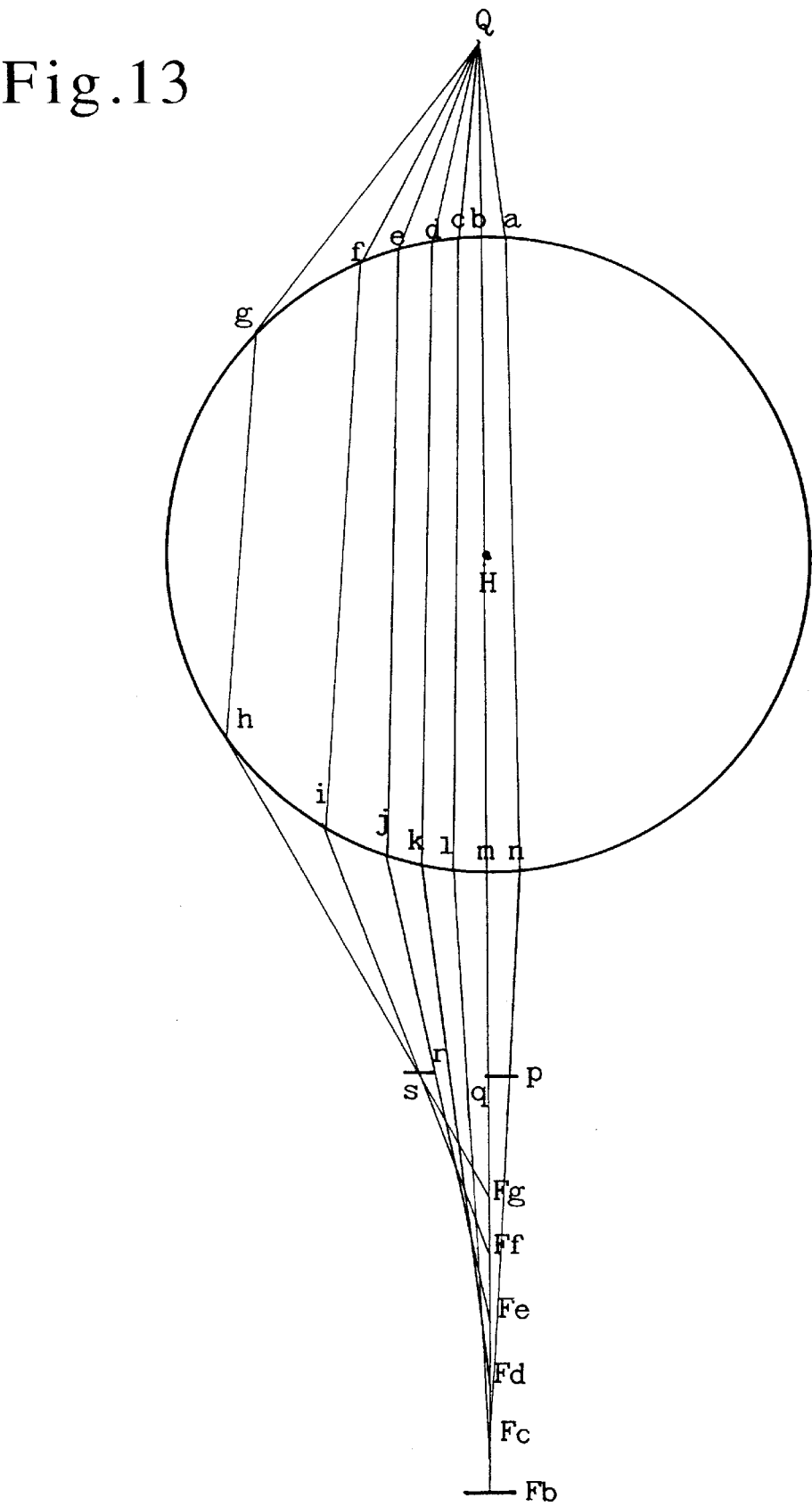
FIG. 13 is a beam diagram at a ball lens for clarifying that the beams emanating from a fiber (Q) converge at different points on the axis depending on the regions where the beams have passed in the lens. Far-axis beams yield a region of excess concentration of light power, since they cross with each other at a point in front of the Gauss image point.

FIG. 12 is a section of an embodiment of a PD module. The main improvement is the reciprocal off-axis deviations of the fiber and the PD in regard to the central axis in order to guide the slanting beam emanating from the oblique-cut fiber through the center (H) of the lens to the center (O) of the PD along a straight line. The orientation of the oblique-cut fiber is an important matter. Although this embodiment may appear to be similar to the prior art of FIG. 2, the embodiment of FIG. 12 is not fully the same as the module of FIG. 2 which aligns the fiber, the lens and the PD on a straight line normal to the PD surface.

In FIG. 12, a header (package) 32 is provided with a submount 33 at the center of the top surface. A photodiode (PD) chip 31 is die-bonded on the submount 33. The header 32 has pins 41, 42 and 43 projecting below. The submount 33 is an insulator with both surfaces metallized (coated with a metal thin film). Thus the top surface is insulated from the bottom surface in the submount. The p-electrode of the PD chip 31 is connected by a wire 36 to the pin 41. The n-electrode of the PD is bonded upon the submount 33. The top of the submount 33 is connected to the pin 43 with a wire 37. The center of the PD chip 31 does not lie on the center of the header 32. The center (O) of the PD chip 31 deviates by a certain distance in a horizontal direction from the center of the header 32. The deviation x of the PD on the header is given by x=L tan $\alpha$, where L is the distance between the center of the lens and the PD and $\alpha$ is the slanting angle of the emanating beam to the central axis which is a line normal to the PD. The PD chip 31 should be die-bonded at a point deviating for x=L tan $\alpha$ from the package center.

A cap 38 has a window having a ball lens 34. The cap 38 is fitted on the header 32 at a central position. The center (H) of the lens 34 coincides with the center (P) of the header 32 in the vertical direction. Z-axis is defined as a normal line standing on the header 32 and including the center (H) of the lens 34. Of course, there may be some unknown error of mounting the cap on the header. The error is now neglected in the following description, because the error can safely be absorbed by an alignment of the fiber. A cylindrical sleeve 44 is welded upon the header 32. A ferrule 45 cramps an end of an optical fiber 35. The end 54 of the ferrule with the fiber is ground obliquely at an angle $\theta$ for preventing the reflection light from returning the laser. A point 52 is the lowest point of the ferrule end. The oblique angle $\theta$ is, in general, 5° to 10°. This example adopts 8° of the oblique-cutting.

$\theta=8°$ gives a $\alpha=3.9°$. The vertical distance L between the lens center (H) and the chip is determined by the size of the cap 38. Here L=2000 $\mu$m (2 mm). The PD should be fixed at a point deviating by x=−136$\mu$m (L tan $\alpha$) from the center (P) of the header. Such an off-axial bonding of the PD may be called an "offset mounting". Alternative mounting is deviating the lens by +136 $\mu$m and coinciding the PD center with the header center. Generally the PD should be deviated from the lens by x=−L tan $\alpha$. It is, however, convenient for alignments to keep the lens on the axis and deviating the PD.

The ferrule 45 is inserted into a ferrule holder 46. The ferrule holder 46 is welded upon the end surface (G) of the sleeve 44. The center of the ferrule holder 46 does not lie above the center (P) of the header 32. The ferrule holder 46 deviates from the central axis (Z-axis) in the direction contrary to the deviation of the PD chip 31. Besides, the lowest edge (S) is the closest to the axial line (Z-axis) among any points of the oblique-cut end 40 of the fiber 35. The orientation is important. This is the iso-orientation which has previously been defined. A mark 51 is drawn on the side of the ferrule holder 46 for showing the direction of the lowest edge (S). The mark 51 teaches us the orientation of the fiber. The iso-orientation of FIG. 12 can be accomplished by coinciding the mark 51 with an imaginary plane including the lens center (H) and the PD center (O) and being vertical to the header plane (XY-plane).

The alignment of the fiber includes an axial adjustment in the Z-direction, a parallel displacement in XY-plane and a rotational adjustment around the fiber axis. The three kinds of alignments can determine the optimum location of a fiber in a PD module. The axial adjustment means an axial sliding of the fiber in the Z-direction in the ferrule for seeking an optimum point which makes Gauss' image of the fiber end at the back of the PD and gives sufficient light power to the PD. Namely, the axial adjustment determines the fiber end at a defocused spot, keeping the maximum sensitivity of the PD in compliance with the mentioned prior application No. 6-171873. Here assuming that the axial adjustment has already been done, two other adjustments of the xy-parallel displacement and the rotation adjustment are explained in detail.

Conventionally, the alignment in a certain plane parallel with XY-plane includes the parallel displacement and the rotation. Namely conventional alignments in XY-plane= parallel displacement+rotation. Fortunately, this invention can dispense with the rotation adjustment in some cases. Otherwise, this invention can simplify the rotation adjustment in other cases.

The first step is the search of the spot which gives the maximum light power (highest sensitivity) and the minimum distortion (smallest $IMD_2$) to the PD by displacing the ferrule holder 46 in parallel on the end surface of the sleeve 44. During the parallel displacement, the output of the PD is monitored. The second step is the investigation of the orientation of the fiber by rotating the fiber 35 with the ferrule holder 46 for seeking the orientation which realizes the minimum distortion $IMD_2$. When the optimum orientation is identified, the ferrule holder 46 is fixed to the sleeve 44 at the position and at the orientation. This invention can alleviate the time of the rotation adjustment to a great extent, since the preferable orientation of the fiber has been predetermined so as to dispose the lowest edge (S) closest to the axial line. In any case, the rotation adjustment can be done within 90 degrees at most. In some cases, this invention can do without the rotation adjustment at all. In short, the alignment of the invention in XY-plane=parallel displacement+restricted rotation. Or the alignment=parallel displacement. The omission of the rotation adjustment in a full range of 360 degrees alleviates the time of the alignment.

Figure 4:
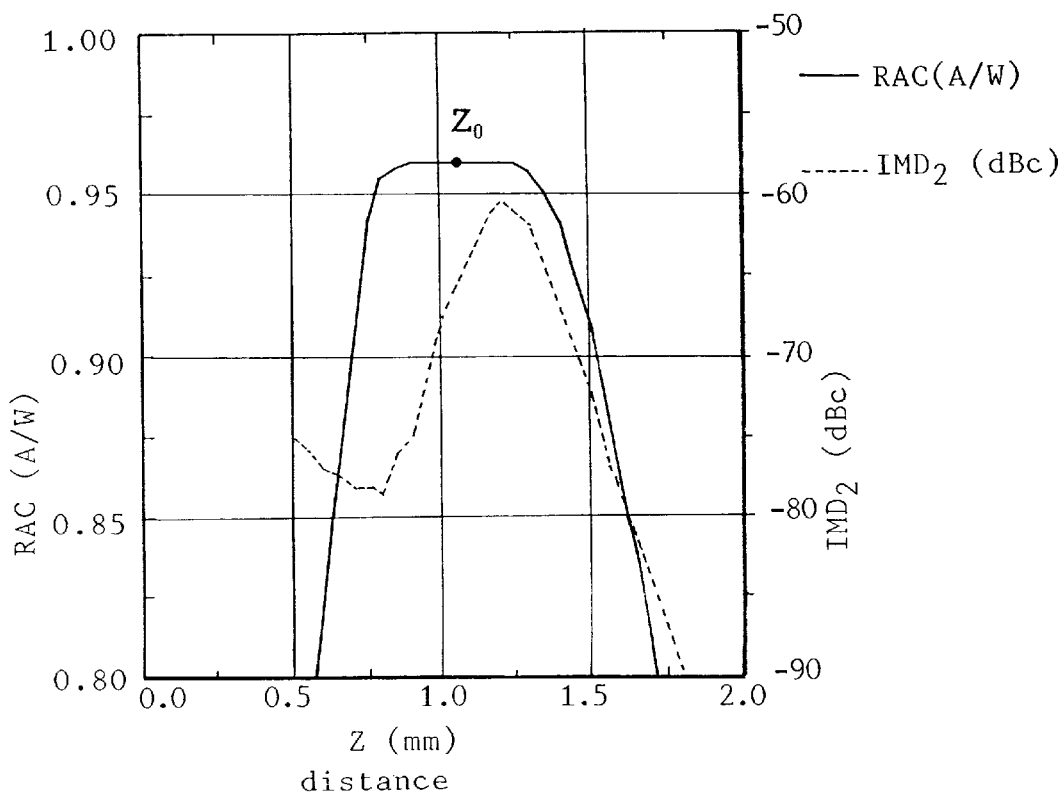
FIG. 4 is a graph showing the dependence of AC sensitivity RAC (A/W) and distortion $IMD_2$ upon the distance Z (mm) between the lens center and the fiber end in the defocus PD module of No. 6-171873.
Figure 5:
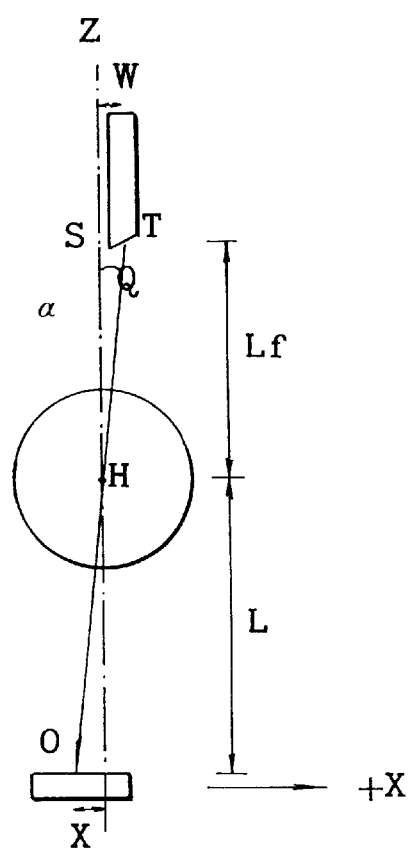
FIG. 5 is a schematic view of a fiber, a lens and a PD in an iso-orientation disposition in which a beam emanating slantingly from the fiber passes the center (H) of the lens and arrives at the center (O) of the PD along a direct line. $\theta=8°$, $\alpha=3.7°$, W=120 μm, X=−140 μm, Lf=1850 μm and L=2100 μm.
Figure 6:
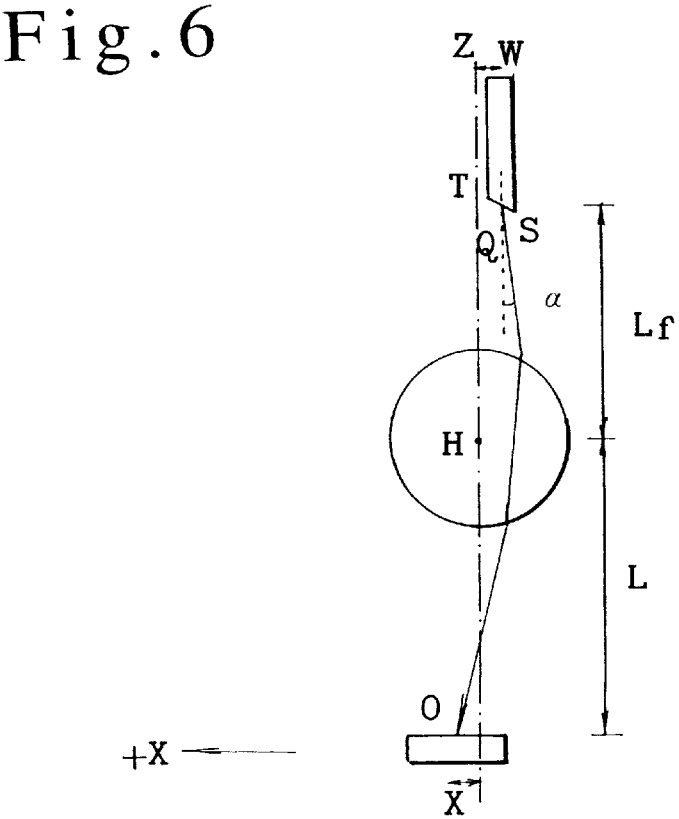
FIG. 6 is a schematic view of a fiber, a lens and a PD in an aniso-orientation disposition in which a beam emanating slantingly from the fiber passes a peripheral part of the lens and arrives at the center (O) of the PD along a bending curve. $\theta=8°$, $\alpha=3.7°$, W=160 μm, X=+140 μm, Lf=1650μm and L=2100μm.
Figure 7:
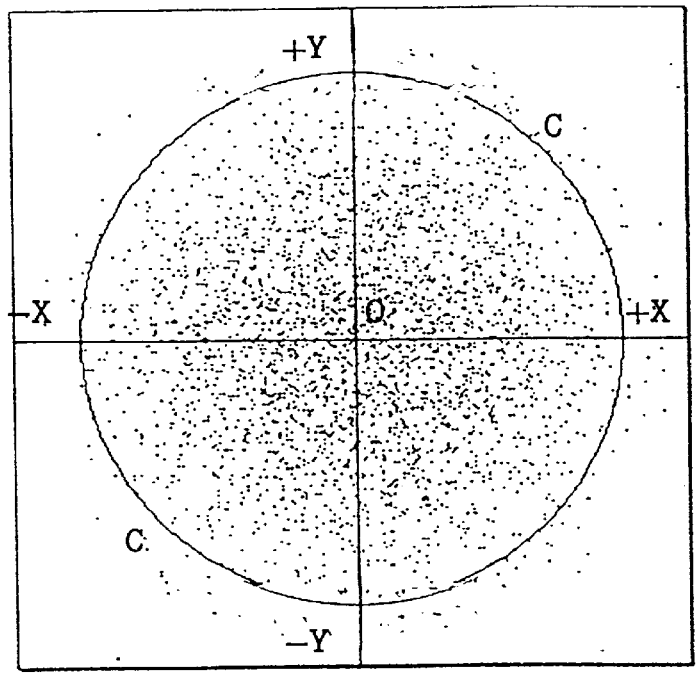
FIG. 7 is a diagram of the distribution of beams arriving on the PD surface calculated on the beam tracking analysis which traces individual beams emanating with an equal probability per solid angle in an aperture, for the case of the iso-orientation PD module of FIG. 5.
Figure 8:
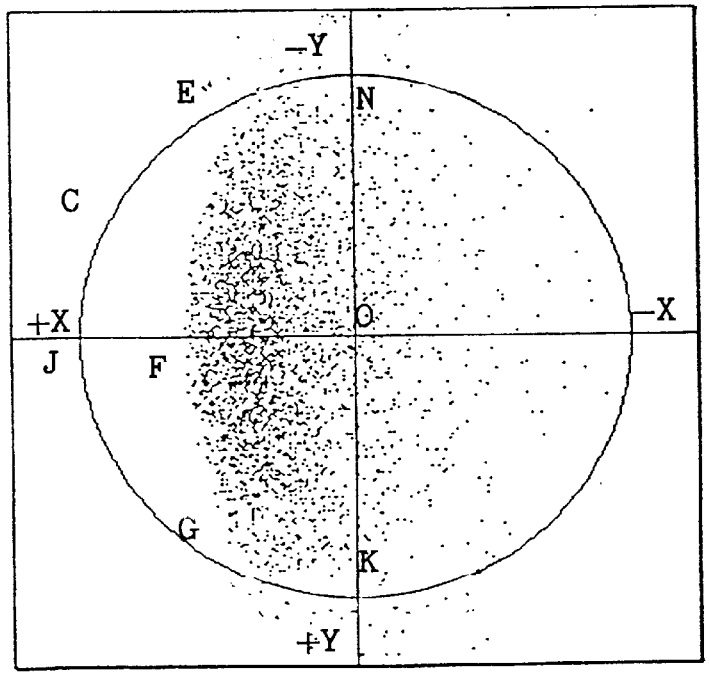
FIG. 8 is a diagram of the distribution of beams arriving on the PD surface calculated on the beam tracking analysis which traces individual beams emanating with an equal probability per solid angle in an aperture, for the case of the aniso-orientation PD module of FIG. 6.
Figure 9:
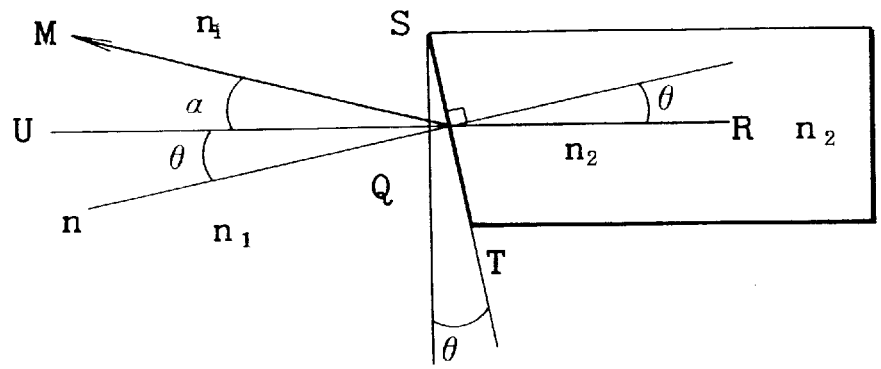
FIG. 9 is an explanatory side view of an end of a fiber for showing the refraction of a beam at the obliquely-cut end.
Figure 10:
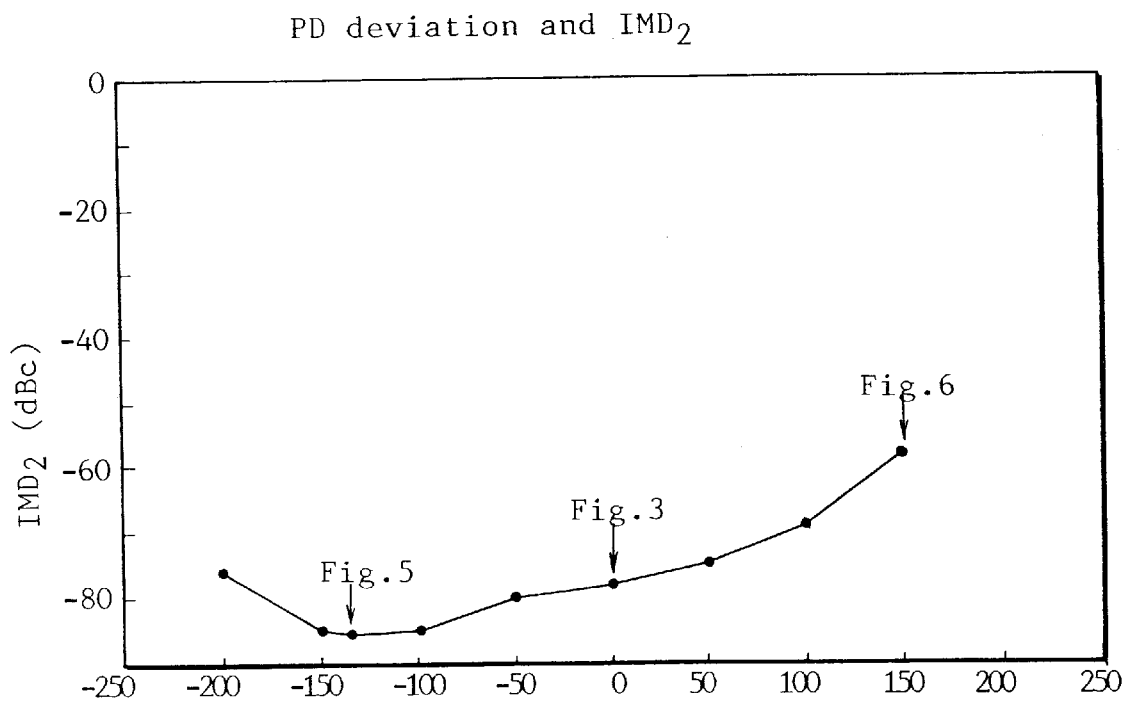
FIG. 10 is a graph showing the result of measurement of the relation between the deviation X of PD and the $IMD_2$ when the fiber is displaced in the contrary direction to the PD with keeping the highest sensitivity of 0.9 A/W.

Ideally the alignment of the fiber should be carried out by monitoring both the power and the distortion of the PD. But, it is a well known fact that the input power has a maximum value in a wide range, as shown in FIG. 4. Then the alignment can be done by monitoring only the distortion. The distortion is more important than the sensitivity in PDs.

In an ideal coordination, the central beam emanating from the fiber end (Q) with a slanting angle of α should pass the lens center (H) and should shoot the PD center (O). Manufacturing errors may divert the central beam from (H) and (O) in products. The position and the orientation of the fiber are actually determined by three or two kinds of alignments for seeking the minimum distortion and the maximum sensitivity. Thus, it is not necessary that QHO is an exactly straight line. But in any case, the points (Q), (H) and (O) align nearly on a direct line in actual PD modules manufactured by this invention.

What we claim is:

1. A method of producing a photodiode module comprising the steps of:

calculating a slanting angle α of an emanating beam refracted at an end (Q) of an optical fiber being cut obliquely of an angle θ and having a lowest edge (S) and a highest edge (T);

calculating a deviation X=L tan α where L is a predetermined distance between the center (H) of a lens and a photodiode chip;

mounting the photodiode chip at a point deviating for X=L tan α from a center (P) of a package;

fixing the lens with aberration at a point at which the center (H) of the lens is distanced by L from the photodiode chip and coincides with the center (P) of the package in a direction vertical to the package;

maintaining the obliquely cut optical fiber in an orientation in which the lowest edge (S) of the oblique end (ST) is closest to the central axis passing the lens center (H) and being normal to the package;

moving the fiber in a plane vertical to the central axis and in a direction parallel to the central axis for seeking a point which gives the photodiode the smallest distortion with a desired sensitivity; and fixing the fiber at the point.

2. A method as claimed in claim 1, wherein the point at which the end of the fiber is fixed so close to the lens having aberration that Gauss' image point of the fiber end is formed by the lens at a point farther from the lens than the photodiode.

3. A method as claimed in claim 2, wherein no rotation adjustment of the fiber is carried out when the fiber end is aligned to the lens and the photodiode by moving the fiber in the plane vertical to the central axis and in the direction parallel to the central axis.

4. A method as claimed in claim 2, wherein a rotation adjustment of the fiber is carried out within 90 degrees when the fiber end is aligned to the lens and the photodiode by moving the fiber in the plane vertical to the central axis and in the direction parallel to the central axis.

5. A method of producing a photodiode module comprising the steps of calculating a slanting angle α of an emanating beam refracted at an end (Q) of an optical fiber being cut obliquely of an angle θ and having a lowest edge (S) and a highest edge (T);

calculating a deviation X =L tan α where L is a predetermined distance between the center (H) of a lens and a photodiode chip;

mounting the photodiode chip at a point deviating by an amount β (including β=0) from a center (P) of a package;

fixing the lens with aberration at a point at which the center (H) of the lens is distanced by L from the photodiode chip and coincides with a point deviating for β+X from the center (P) of the package in a direction vertical to the package;

maintaining the obliquely cut optical fiber in an orientation in which the lowest edge (S) of the oblique end (ST) is closest to the central axis passing the lens center (H) and being normal to the package;

moving the fiber in a plane vertical to the central axis and in a direction parallel to the central axis for seeking a point which gives the photodiode the smallest distortion with a desired sensitivity; and fixing the fiber at the point.

6. A method as claimed in claim 5, wherein the point at which the end of the fiber is fixed is so close to the lens having aberration that Gauss' image point of the fiber end is formed by the lens at a point farther from the lens than the photodiode.

7. A method as claimed in claim 6, wherein no rotation adjustment of the fiber is carried out when the fiber end is aligned to the lens and the photodiode by moving the fiber in the plane vertical to the central axis and in the direction parallel to the central axis.

8. A method as claimed in claim 6, wherein a rotation adjustment of the fiber is carried out within 90 degrees when the fiber end is aligned to the lens and the photodiode by moving the fiber in the plane vertical to the central axis and in the direction parallel to the central axis.

9. A photodiode module comprising;

an optical fiber having an obliquely-cut end (ST) with a lowest edge (S) and a highest edge (T) for emitting beams;

a lens with aberration for converging the beams emitted from the optical fiber; and a photodiode (PD) chip for converting the converged beams into electric signals;

wherein a center (O) of the photodiode deviates for L tan α, where L is a predetermined distance between the center of the lens and photodiode (PD) and α is an angle of an emanating beam refracted at an end of the optical fiber, from a lens axis passing the center (H) of the lens in the direction of a projection of a vector TS in a plane vertical to the lens axis and the fiber end is fixed at a point deviating in a reverse direction of the projection of the vector TS and giving the smallest distortion to the photodiode.

10. A photodiode module as claimed in claim 9, wherein the point at which the end of the fiber is fixed so close to the lens having aberration that Gauss' image point of the fiber end is formed by the lens at a point farther from the lens than the photodiode.

11. A photodiode module as claimed in claim 10, wherein the oblique cut angle of the fiber end is 4 degrees to 10 degrees.

12. A photodiode module as claimed in claim 11, wherein the lens with aberration is a ball lens.

13. A photodiode module as claimed in claim 12, wherein the optical fiber is a single mode fiber with a core of about a 10 $\mu$m diameter, the oblique cut angle of the fiber end is nearly 8 degrees, the distance Lf between the lens center (H) and the fiber end (Q) is about 1850 $\mu$m, the refractive index of the lens is 1.5, the diameter of the ball lens is 1.5 mm, the distance L between the lens center (H) and the PD is about 2100 $\mu$m and the deviation X of the PD chip from the lens center (H) is 100 $\mu$m to 200 $\mu$m.

14. A photodiode module as claimed in claim 13, wherein the PD chip has an InGaAs light receiving layer.

15. A photodiode module as claimed in claim 14, wherein the PD chip has an InP substrate, an InP buffer layer, an InGaAs light receiving layer and an InP window layer.

16. A photodiode module as claimed in claim 15, wherein the PD chip has extra pn-junctions at peripheries made by zinc diffusion for eliminating extra carriers yielded by stray light entering the peripheries.

17. A photodiode module as claimed in claim 15, wherein the photodiode module has an $IMD_2$ that is smaller than $-80$ dB.

18. A photodiode module as claimed in claim 13, wherein the PD chip has an InGaAsP light receiving layer.

19. A photodiode module as claimed in claim 18, wherein the PD chip has an InP substrate, an InP buffer layer, an InGaAsP light receiving layer and an InP window layer.

20. A photodiode module as claimed in claim 19, wherein the PD chip has extra pn-junctions at peripheries made by zinc diffusion for eliminating extra carriers yielded by stray light entering the peripheries.

21. A photodiode module as claimed in claim 19, wherein the photodiode module has an $IMD_2$ that is smaller than $-85$ dB.

* * * * *